(12) United States Patent
Kim et al.

(10) Patent No.: US 10,394,283 B2
(45) Date of Patent: Aug. 27, 2019

(54) DISPLAY SYSTEM AND RELATED METHOD

(71) Applicant: Samsung Display Co., Ltd., Yongin-si, Gyeonggi-do (KR)

(72) Inventors: Gunmo Kim, Yongin-si (KR); Jinkoo Kang, Yongin-si (KR); Bekhyun Lim, Yongin-si (KR)

(73) Assignee: Samsung Display Co., Ltd. (KR)

( * ) Notice: Subject to any disclaimer, the term of this patent is extended or adjusted under 35 U.S.C. 154(b) by 211 days.

(21) Appl. No.: 15/365,765

(22) Filed: Nov. 30, 2016

(65) Prior Publication Data

US 2017/0153670 A1  Jun. 1, 2017

(30) Foreign Application Priority Data

Dec. 1, 2015 (KR) .................. 10-2015-0170080

(51) Int. Cl.
| | | |
|---|---|---|
| *G06F 1/16* | (2006.01) | |
| *G06F 3/14* | (2006.01) | |
| *B60K 35/00* | (2006.01) | |
| *B60K 37/02* | (2006.01) | |

(52) U.S. Cl.
CPC ............ *G06F 1/1652* (2013.01); *B60K 35/00* (2013.01); *G06F 1/1647* (2013.01); *G06F 3/1446* (2013.01); *B60K 37/02* (2013.01); *G09G 2380/10* (2013.01)

(58) Field of Classification Search
CPC .... G06F 1/1652; G06F 1/1647; G06F 3/1446; B60K 35/00; B60K 37/02; G09G 2380/10
See application file for complete search history.

(56) References Cited

U.S. PATENT DOCUMENTS

| 8,982,070 B2* | 3/2015 | Tomimori | G06F 3/0483 |
| | | | 345/1.1 |
| 9,703,518 B2* | 7/2017 | Yamakita | G06F 3/1431 |
| 9,753,495 B2* | 9/2017 | Matsumoto | G06F 1/1637 |
| 2006/0145942 A1* | 7/2006 | Maatta | G02B 5/045 |
| | | | 345/1.3 |
| 2010/0056222 A1* | 3/2010 | Choi | H04M 1/0245 |
| | | | 455/566 |
| 2011/0006892 A1 | 1/2011 | Karpinsky | |

(Continued)

FOREIGN PATENT DOCUMENTS

| KR | 10-2011-0130459 A | 12/2011 |
| KR | 10-2015-0028561 A | 3/2015 |

(Continued)

*Primary Examiner* — Nitin Patel
*Assistant Examiner* — Amy Onyekaba
(74) *Attorney, Agent, or Firm* — Innovation Counsel LLP

(57) ABSTRACT

A display system may include a first display apparatus and a second display apparatus. The first display apparatus may include a first image-display surface. The second display apparatus may include a second image-display surface. At least one of the first image-display surface and the second image-display surface may perform at least one of extending and bending in response to at least one of a first condition and a second condition. The first condition may be related to that the second image-display surface moves relative to the first image-display surface. The second condition may be related to that a distance between the first image-display surface and the second image-display surface becomes equal to a predetermined length.

19 Claims, 19 Drawing Sheets

(56) References Cited

U.S. PATENT DOCUMENTS

| | | | | |
|---|---|---|---|---|
| 2011/0216064 | A1* | 9/2011 | Dahl | G06F 1/1616 345/428 |
| 2012/0075334 | A1* | 3/2012 | Pourbigharaz | G06F 3/1438 345/619 |
| 2012/0084675 | A1* | 4/2012 | Sirpal | G06F 1/1616 715/761 |
| 2012/0139815 | A1* | 6/2012 | Aono | G06F 1/1616 345/1.3 |
| 2012/0242685 | A1* | 9/2012 | Ohtake | G06F 3/1446 345/619 |
| 2013/0009998 | A1* | 1/2013 | Hsieh | G06F 3/1438 345/667 |
| 2013/0076591 | A1* | 3/2013 | Sirpal | G06F 3/1438 345/1.3 |
| 2013/0181885 | A1* | 7/2013 | Tamura | H04W 52/0277 345/1.3 |
| 2013/0229324 | A1* | 9/2013 | Zhang | G09G 5/00 345/1.3 |
| 2013/0335359 | A1* | 12/2013 | Shima | G06F 1/1616 345/173 |
| 2014/0198251 | A1* | 7/2014 | Li | H04N 11/20 348/453 |
| 2014/0375530 | A1* | 12/2014 | Delaporte | G06F 1/1616 345/1.3 |
| 2015/0070771 | A1 | 3/2015 | Jeon et al. | |
| 2015/0097755 | A1* | 4/2015 | Kim | G06F 3/1446 345/1.3 |
| 2015/0130759 | A1 | 5/2015 | Heo | |
| 2015/0146349 | A1 | 5/2015 | Choi et al. | |
| 2015/0169077 | A1 | 6/2015 | Lee | |
| 2015/0378393 | A1* | 12/2015 | Erad | G06F 1/1616 345/1.3 |
| 2016/0077652 | A1* | 3/2016 | Yang | B60K 37/06 345/174 |
| 2016/0132281 | A1* | 5/2016 | Yamazaki | G06F 3/1446 345/1.3 |
| 2017/0090842 | A1* | 3/2017 | Sasahara | G09G 5/006 |
| 2018/0129462 | A1* | 5/2018 | Han | H04N 5/445 |

FOREIGN PATENT DOCUMENTS

| | | |
|---|---|---|
| KR | 10-2015-0046920 A | 5/2015 |
| KR | 10-2015-0054279 A | 5/2015 |
| KR | 10-2015-0060161 A | 6/2015 |
| KR | 10-2015-0071314 A | 6/2015 |

* cited by examiner

DISPLAY SYSTEM AND RELATED METHOD

CROSS-REFERENCE TO RELATED APPLICATION

This application claims the benefit of Korean Patent Application No. 10-2015-0170080, filed on Dec. 1, 2015, in the Korean Intellectual Property Office; the disclosure of the Korean Patent Application is incorporated herein in its entirety by reference.

BACKGROUND

1. Field

One or more embodiments relate to a display apparatus system including two or more adjacent display apparatuses.

2. Description of the Related Art

Display apparatuses have been applied to various areas. As an example, display apparatuses may be provided at a vehicle dashboard. The display apparatuses may be fixed at the dashboard and may have limited functions and/or limited arrangements.

SUMMARY

According to an embodiment, a display apparatus system may include a first display apparatus; and a second display apparatus including a second edge adjacent to a first edge of the first display apparatus by a space with a certain distance, in which a display range of at least one of the first and second display apparatuses may be extended and the display range may be arranged in the space with the certain distance between the first and second display apparatuses.

According to an embodiment, a display apparatus system may include a first display apparatus including a first edge and a second display apparatus including a second edge, in which the second display apparatus may be arranged adjacent to the first display apparatus and may move in a first direction with respect to the first display apparatus so that a space between the first and second edges may be changed from a first distance to a second distance longer than the first distance, and when the distance between the first and second edges is equal to the first distance, a display range of at least one of the first and second display apparatuses may be extended and the display range may be arranged in the space with the first distance between the first and second display apparatuses.

An embodiment may be related to a display system. The display system may include a first display apparatus and a second display apparatus. The first display apparatus may include a first image-display surface. The second display apparatus may include a second image-display surface. At least one of the first image-display surface and the second image-display surface may perform at least one of extending and bending in response to at least one of a first condition and a second condition. The first condition may be related to that the second image-display surface moves relative to the first image-display surface. The second condition may be related to that a distance between the first image-display surface and the second image-display surface becomes equal to a predetermined length. The features may be appreciated with reference to, for example, one or more of FIG. 2A, FIG. 2B, FIG. 2C, FIG. 3A, FIG. 3B, FIG. 4A, FIG. 4B, FIG. 5A, FIG. 5B, FIG. 7A, FIG. 7B, FIG. 9A, FIG. 9B, FIG. 10A, and FIG. 10B and related description.

The first condition may be movement of the second image-display surface away from the first image-display surface. The features may be appreciated with reference to, for example, one or more of FIG. 2A, FIG. 2B, FIG. 2C, FIG. 3A, FIG. 3B, FIG. 4A, FIG. 4B, FIG. 5A, FIG. 5B, FIG. 10A, and FIG. 10B and related description.

The first condition may be movement of the second image-display surface toward the first image-display surface. The features may be appreciated with reference to, for example, one or more of FIG. 7A, FIG. 7B, FIG. 9A, and FIG. 9B and related description.

The second condition may be that the distance between the first image-display surface and the second image-display surface increases to become equal to the predetermined length. The features may be appreciated with reference to, for example, one or more of FIG. 2A, FIG. 2B, FIG. 2C, FIG. 3A, FIG. 3B, FIG. 4A, FIG. 4B, FIG. 5A, FIG. 5B, FIG. 10A, and FIG. 10B and related description.

The second condition may be that the distance between the first image-display surface and the second image-display surface decreases to become equal to the predetermined length. The first condition may be movement of the second image-display surface toward the first image-display surface. The features may be appreciated with reference to, for example, one or more of FIG. 7A, FIG. 7B, FIG. 9A, and FIG. 9B and related description.

The second image-display surface may extend toward the first image-display surface responsive to the at least one of the first condition and the second condition. The features may be appreciated with reference to, for example, one or more of FIG. 2A, FIG. 2B, FIG. 2C, FIG. 3A, FIG. 3B, FIG. 4A, FIG. 4B, FIG. 5A, FIG. 5B, FIG. 10A, and FIG. 10B and related description.

The first image-display surface may extend toward the second image-display surface responsive to the at least one of the first condition and the second condition. The features may be appreciated with reference to, for example, one or more of FIG. 2A, FIG. 2B, FIG. 2C, FIG. 3A, FIG. 3B, FIG. 4A, FIG. 4B, FIG. 5A, FIG. 5B, FIG. 10A, and FIG. 10B and related description.

The second image-display surface may extend in at least two directions toward the first image-display surface responsive to the at least one of the first condition and the second condition. The features may be appreciated with reference to, for example, one or more of FIG. 3A, FIG. 3B, FIG. 7A, and FIG. 7B and related description.

The first image-display surface may extend in two or more directions toward the second image-display surface responsive to the at least one of the first condition and the second condition. The features may be appreciated with reference to, for example, one or more of FIG. 3A, FIG. 3B, FIG. 7A, and FIG. 7B and related description.

A first portion of the second image-display surface may bend with respect to a second portion of the second image-display surface toward the first image-display surface responsive to the at least one of the first condition and the second condition. The features may be appreciated with reference to, for example, one or more of FIG. 4A and FIG. 4B and related description.

A width of the first portion of the second image-display surface may be less than or equal to the predetermined length. The features may be appreciated with reference to, for example, one or more of FIG. 4A and FIG. 4B and related description.

A width of the first portion of the second image-display surface may be substantially equal to the predetermined length. The features may be appreciated with reference to, for example, one or more of FIG. 4A and FIG. 4B and related description.

The first portion of the second image-display surface may not be coplanar with either of the first image-display surface and the second portion of the second image-display surface before the bending. The first portion of the second image-display surface may be coplanar with at least one of the first image-display surface and the second portion of the second image-display surface as a result of the bending. The features may be appreciated with reference to, for example, one or more of FIG. 4A and FIG. 4B and related description.

The first image-display surface and the second image-display surface may operate in a first collaborative display mode prior to the at least one of the extending and bending, e.g., when the distance between the first image-display surface and the second image-display surface is unequal to the predetermined length. The first image-display surface and the second image-display surface may operate in a second collaborative display mode responsive the at least one of the extending and bending. The first image-display surface may display a first portion of a first object in the first collaborative display mode. The second image-display surface may display a second portion of the first object in the first collaborative display mode. The first image-display surface may display a first portion of a second object in the second collaborative display mode. The second image-display surface may display a second portion of the second object in the second collaborative display mode. The display system may have a first total image-display area in the first collaborative display mode. The display system may have a second total image-display area in the second collaborative display mode. The second total image-display area may be larger than the first total image-display area. The features may be appreciated with reference to, for example, one or more of FIG. 2A, FIG. 2B, FIG. 2C, FIG. 3A, FIG. 3B, FIG. 4A, FIG. 4B, FIG. 5A, FIG. 5B, FIG. 10A, and FIG. 10B and related description. For example, in a collaborative mode, the first image-display surface may display an upper portion of a horse, and the second image-display surface may display a lower portion of the horse.

The first image-display surface and the second image-display surface may operate in an individual display mode prior to the at least one of the extending and bending, e.g., when the distance between the first image-display surface and the second image-display surface is unequal to the predetermined length. The first image-display surface and the second image-display surface may operate in a collaborative display mode responsive the at least one of the extending and bending. The first image-display surface may display a first object in the individual display mode. The second image-display surface may display a second object in the individual display mode. The first image-display surface may display a first portion of a third object in the collaborative display mode. The second image-display surface may display a second portion of the third object in the collaborative display mode. The display system may have a first total image-display area in the individual display mode. The display system may have a second total image-display area in the collaborative display mode. The second total image-display area may be larger than the first total image-display area. The features may be appreciated with reference to, for example, one or more of FIG. 7A and FIG. 7B and related description.

The first image-display surface and the second image-display surface may operate in an individual display mode when the first image-display surface is not coplanar with (e.g., is substantially parallel to) the second image-display surface. The first image-display surface and the second image-display surface may operate in a collaborative display mode when the first image-display surface is substantially coplanar with the second image-display surface. The first image-display surface may display a first object in the individual display mode. The second image-display surface may display a second object in the individual display mode. The first image-display surface may display a first portion of a third object in the collaborative display mode. The second image-display surface may display a second portion of the third object in the collaborative display mode. The second total image-display area may be larger than the first total image-display area. The features may be appreciated with reference to, for example, one or more of FIG. 7A and FIG. 7B and related description.

The display system may have a first total image-display area in the individual display mode. The display system may have a second total image-display area in the collaborative display mode. The second total image-display area may be larger than the first total image-display area. The features may be appreciated with reference to, for example, one or more of FIG. 7A and FIG. 7B and related description.

The second image-display surface may extend in a first direction toward the first image-display surface subsequent to movement of the second image-display surface relative to the first image-display surface in a second direction. The second direction may be different from the first direction. The features may be appreciated with reference to, for example, one or more of FIG. 2A, FIG. 2B, FIG. 2C, FIG. 3A, FIG. 3B, FIG. 4A, FIG. 4B, FIG. 5A, FIG. 5B, FIG. 7A, FIG. 7B, FIG. 9A, FIG. 9B, FIG. 10A, and FIG. 10B and related description.

The second direction may be opposite to the first direction. The features may be appreciated with reference to, for example, one or more of FIG. 2A and FIG. 2B and related description.

The second direction may be rotational with respect to the first direction. The features may be appreciated with reference to, for example, one or more of FIG. 4A and FIG. 4B and related description.

The second direction may be oriented at an angle with respect to the first direction. The angle may be greater than 0 degree and less than 180 degrees. For example, the angle may be substantially equal to 90 degrees. The features may be appreciated with reference to, for example, one or more of FIG. 7A, FIG. 7B, FIG. 9A, and FIG. 9B and related description.

An embodiment may be related to a method of operating a display system. The display system may include a first display apparatus and a second display apparatus. The first display apparatus may include a first image-display surface. The second display apparatus may include a second image-display surface. The method may include performing at least one of extending and bending of at least one of the first image-display surface and the second image-display surface in response to at least one of a first condition and a second condition. The first condition may be related to that the second image-display surface moves relative to the first image-display surface. The second condition may be related to that a distance between the first image-display surface and the second image-display surface becomes equal to a predetermined length. The features may be appreciated with reference to, for example, one or more of FIG. 2A, FIG. 2B, FIG. 2C, FIG. 3A, FIG. 3B, FIG. 4A, FIG. 4B, FIG. 5A, FIG. 5B, FIG. 7A, FIG. 7B, FIG. 9A, FIG. 9B, FIG. 10A, and FIG. 10B and related description.

Embodiments may advantageously enable sufficient possibilities of functionalities and/or arrangements of display apparatuses.

DETAILED DESCRIPTION

Figure 1:
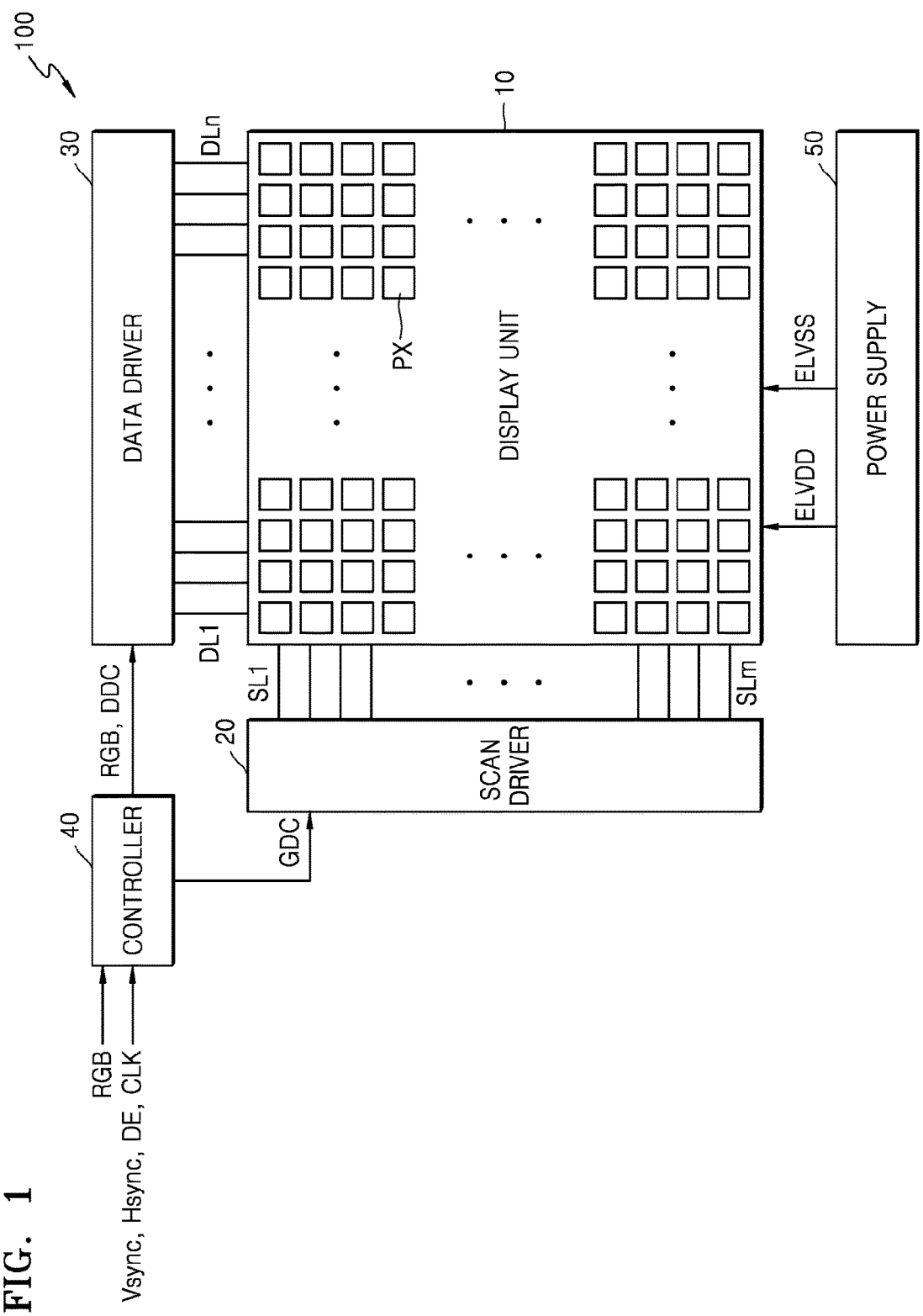
FIG. 1 is a block diagram illustrating an example of a display apparatus included in a display apparatus system according to an embodiment.

Example embodiments are illustrated with reference to the accompanying drawings, wherein like reference numerals may refer to like elements. Embodiments may have different forms and should not be construed as being limited to the descriptions set forth herein. While such terms as "first," "second," etc., may be used to describe various components, such components must not be limited to the above terms. The above terms may be used to distinguish one component from another. Thus, a first element discussed in this application may be termed a second element without departing from embodiments. The description of an element as a "first" element may not require or imply the presence of a second element or other elements. The terms "first", "second", etc. may also be used herein to differentiate different categories or sets of elements. For conciseness, the terms "first", "second", etc. may represent "first-category (or first-set)", "second-category (or second-set)", etc., respectively.

An expression used in the singular may encompass the expression of the plural, unless it has a clearly different meaning in the context.

In this application, operation of a display apparatus may represent operation of an image-display surface (e.g., a surface or area on which images according to input signals are displayed) of the display apparatus; operation of an image-display surface of a display apparatus may represent operation of the display apparatus. As an example, extension, stretching, bending, or movement of a display apparatus may represent extension, stretching, bending, or movement of an image-display surface of the display apparatus. As another example, extension, stretching, bending, or movement of an image-display surface of a display apparatus may represent extension, stretching, bending, or movement of the display apparatus.

In this application, passive verb forms and active verb forms may be used interchangeably. For example, "be extended" and "extend" may be used interchangeably; "be bent" and "bend" may be used interchangeably; "be stretched" and "stretch" may be used interchangeably.

FIG. 1 is a block diagram illustrating an example of a display apparatus 100 included in a display apparatus system according to an embodiment.

Referring to FIG. 1, the display apparatus 100 included in a display apparatus system may include a display unit 10, a scan driver 20, a data driver 30, a controller 40 and a power supply 50.

The display apparatus 100 included in a display apparatus system according to an embodiment may include one or more of various apparatuses such as a liquid crystal display apparatus, a thin film transistor-liquid crystal display apparatus, an organic light emitting display apparatus, a three-dimensional display apparatus, and an electrophoretic display apparatus. In embodiments, at least a portion of the display apparatus 100 included in the display apparatus system according to an embodiment may include a flexible display apparatus. Especially, at least a portion of the display apparatus 100 included in the display apparatus system according to an embodiment may include a bendable display apparatus or a stretchable display apparatus. A case in which the display apparatus 100 is an organic light emitting display apparatus will be described as an example below. In embodiments, the display apparatus 100 may be a bendable display apparatus and/or a stretchable display apparatus.

The display unit 10 may include a plurality of pixels PX arranged in a matrix form. Each pixel PX may be connected to a corresponding scan line among scan lines SL1 through SLm and to a corresponding data line among data lines DL1 through DLn, and a control signal and a data voltage may be provided thereto. Each of the scan lines SL1 through SLm may transmit a control signal outputted from the scan driver 20 to pixels PX on an identical row, and each of the data lines DL1 through DLn may transmit a data voltage outputted from the data driver 30 to pixels PX on an identical column. Each of the scan lines SL1 through SLm is illustrated as one line in FIG. 1; however, some pixels PX may include a plurality of lines to transmit a plurality of control signals in parallel.

Pixels PX may receive a first driving voltage ELVDD and a second driving voltage ELVSS. The first driving voltage ELVDD and the second driving voltage ELVSS are driving voltages for an organic light emitting diode of a pixel to emit light, and the first driving voltage ELVDD may have a higher voltage level than the second driving voltage ELVSS. The pixel PX may control the amount of electric current flowing from the first driving voltage ELVDD via the organic light emitting diode to the second driving voltage ELVSS, based on the data voltage transmitted via a corresponding data line. The data voltage may denote a signal transmitted via a corresponding data line or its voltage level. The pixel PX may include a light emitting element emitting light with luminance corresponding to the data voltage or may transmit the amount of light corresponding to the data voltage. The pixel PX may denote a sub-pixel which is a portion of the pixel PX capable of displaying full colors, or may denote a set of sub-pixels, which is a reference for representing resolution, or may denote the pixel PX itself outputting or transmitting a single color (for example, white color). The pixel PX may include a color filter depending on an operation method of the display apparatus 100.

The controller 40 may receive a vertical synchronizing signal Vsync, a horizontal synchronizing signal Hsync, a data enable signal DE, a clock signal CLK, and a data signal RGB from the outside. The controller 40 may control an operation timing of the scan driver 20 and the data driver 30 via timing signals such as the vertical synchronizing signal Vsync, the horizontal synchronizing signal Hsync, the data enable signal DE, and the clock signal CLK. Since the controller 40 may determine a frame period via counting the data enable signal DE during one horizontal scanning period, the vertical synchronizing signal Vsync and the horizontal synchronizing signal Hsync supplied from the outside may be omitted. The data signal RGB may include luminance information of pixels PX. The luminance may have gray levels of certain numbers, for example, 1024, 256, or 64.

The controller 40 may generate control signals including a gate timing control signal GDC to control the operation timing of the scan driver 20 and a data timing control signal DDC to control the operation timing of the data driver 30.

The gate timing control signal GDC may include a gate start pulse GSP, a gate shift clock GSC, a gate output enable GOE, etc. The gate start pulse GSP may be supplied to the scan driver 20 in which a first scan signal is generated. The gate shift clock GSC may be a clock signal inputted in common to the scan driver 20 and may be the clock signal CLK to shift the gate start pulse GSP. The gate output enable GOE signal may control an output of the scan driver 20.

The data timing control signal DDC may include a source start pulse SSP, a source sampling clock SSC, a source output enable SOE signal, etc. The source start pulse SSP may be a signal to control a starting time of data sampling of the data driver 30. The source sampling clock SSC may be the clock signal CLK to control a data sampling operation of the data driver 30 based on a rising edge voltage, a falling edge voltage, or a certain flat voltage. The source output enable SOE may be a signal to control an output of the data driver 30. The source start pulse SSP supplied to the data driver 30 may be omitted depending on a data transfer method.

The scan driver 20 may sequentially generate control signals to operate pixels PX included in the display unit 10, in response to the gate timing control signal GDC supplied from the controller 40. The scan driver 20 may supply control signals to pixels PX included in the display unit 10 via the scan lines SL1 through SLm. A plurality of control signals may be provided to one pixel PX depending on a design of the pixel PX. For example, first through third control signals or more control signals may be provided to one pixel PX during one frame according to a certain sequence.

The data driver 30 may sample the data signal RGB supplied from the controller 40 in a digital type and latch and change the data signal RGB to data in a parallel data system, in response to the data timing control signal DDC supplied from the controller 40. When the data driver 30 changes the data signal RGB in the digital type to data in the parallel data system, depending on the driving method of the display apparatus 100, the data signal RGB in the digital type may be changed to a gamma-based voltage and to a data voltage in an analog type. The data driver 30 may supply the data voltage to pixels PX included in the display unit 10 via the data lines DL1 through DLn.

Figure 2A:
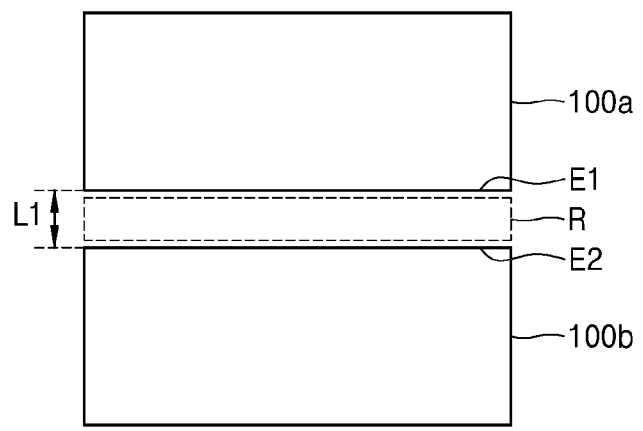
FIG. 2A, FIG. 2B, and FIG. 2C are diagrams illustrating operations and/or movements of display apparatuses of a display apparatus system according to embodiments.
Figure 2B:
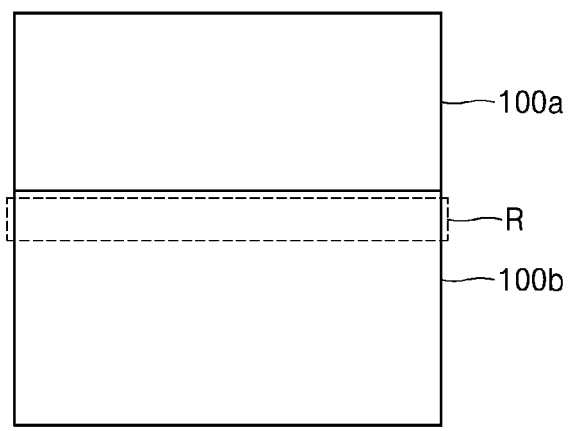
Figure 2C:
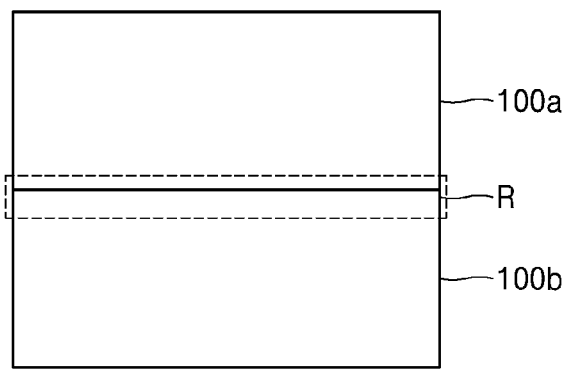

FIGS. 2A through 2C are diagrams illustrating movements of display apparatuses of a display apparatus system according to embodiments.

Referring to FIG. 2A, the display apparatus system may include a first display apparatus 100a and a second display apparatus 100b. Each of the first and second display apparatuses 100a and 100b may be the display apparatus 100 described with reference to FIG. 1. Alternatively, each of the first and second display apparatuses 100a and 100b may each be the display unit 10 sharing together some composing elements of the display unit 100 described with reference to FIG. 1. A case in which each of the first and second display apparatuses 100a and 100b is the display apparatus 100 will be described as an example below.

The first and second display apparatuses 100a and 100b may be arranged adjacent to each other by a space R with a certain distance. In detail, the first and second display apparatuses 100a and 100b may be arranged such that a first edge E1 at a bottom portion of the first display apparatus 100a faces a second edge E2 at a top portion of the second display apparatus 100b; in this case, a range between the first edge E1 and the second edge E2 may be the space R. In embodiments, a distance between the first edge E1 and the second edge E2 may be a first distance L1. The first and second display apparatuses 100a and 100b may be respectively attached to a wall and to a surface of a drawer, which is automatically or manually movable. The first and second display apparatuses 100a and 100b may be flat display apparatuses that attach to a flat surface or curved display apparatuses that attach to a curved surface.

In this case, at least one image-display surface (e.g., display area or display range) of at least one of the first and second display apparatuses 100a and 100b may be extended and fill the space R between the first and second display apparatuses 100a and 100b. In detail, in the case of FIG. 2A, a range in which image-display surfaces (e.g., display areas) of the first and second display apparatuses 100a and 100b exist may be the display range where an image is displayed, and the space R between the first and second display apparatuses 100a and 100b may be a range in which an image may not be displayed. When at least one of the first and second display apparatuses 100a and 100b is extended to the space R, the range which has been the space R may be changed to the display range. In other words, at least one of the first and second display apparatuses 100a and 100b may be extended and the display range may be arranged in the space R.

Referring to FIG. 2B, only one of the first and second display apparatuses 100a and 100b may be extended and the display range may be arranged in the space R. For example, the second display apparatus 100b may be extended in a direction of the second edge E2 toward a location in which the first display apparatus 100b is arranged. In this case, the second display apparatus 100b may be extended until the second edge E2 moves by the first distance L1 and contacts the first edge E1, or the second display apparatus 100b may be extended until the second edge E2 moves a distance less than the first distance L1 and thus, the distance between the first and second edges E1 and E2 becomes less than that prior to an extension of the second display apparatus 100b. In this case, a result that the display range is arranged in the space R also may occur via an arrangement of the second display apparatus 100b in the space R.

Alternatively, referring to FIG. 2C, both of the first and second display apparatuses 100a and 100b may be extended and the display range may be arranged in the space R. For example, the first display apparatus 100a may be extended in a direction of the first edge E1 toward a location in which the second display apparatus 100b is arranged, and the second display apparatus 100b may be extended in a direction of the second edge E2 toward a location in which the first display apparatus 100a is arranged. In this case, both of the first and second edges E1 and E2 may move to a range which has been the space R. The first and second display apparatuses 100a and 100b may be extended until the first and second edges E1 and E2 are in contact with each other, or until the distance between the first and second edges E1 and E2 becomes less than that prior to the extension of the first and second display apparatuses 100a and 100b. When at least one of the first and second display apparatuses 100a and 100b is extended, the first and second display apparatuses 100a and 100b may display one image. In other words, a portion of an image may be displayed on the first display apparatus 100a and the other portion of the image may be displayed on the second display apparatus 100b. When there is the space R between the first and second display apparatuses 100a and 100b, an improper display of one image, such as a portion of one image being not displayed or being disconnected, may occur; however, when the display range of at least one of the first and second display apparatuses 100a and 100b is extended, the image may be properly displayed. A method of extending at least one of the first and second display apparatuses 100a and 100b will be described in detail with reference to FIGS. 4A, 4B, 5A, and 5B below.

In embodiments, the first and second display apparatuses 100a and 100b are illustrated as rectangles of a same size in FIG. 2A; however, it is exemplary only, and the first and second display apparatuses 100a and 100b may have different sizes and may be display apparatuses having various kinds of geometrical shapes such as a polygon, a circle, and an ellipse. The first and second display apparatuses 100a and 100b will be described with reference to FIGS. 3A and 3B.

Figure 3A:
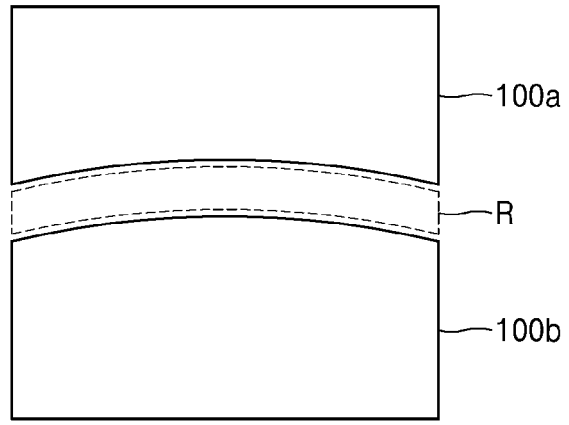
FIG. 3A and FIG. 3B are diagrams illustrating arrangements of display apparatuses of a display apparatus system according to embodiments.
Figure 3B:
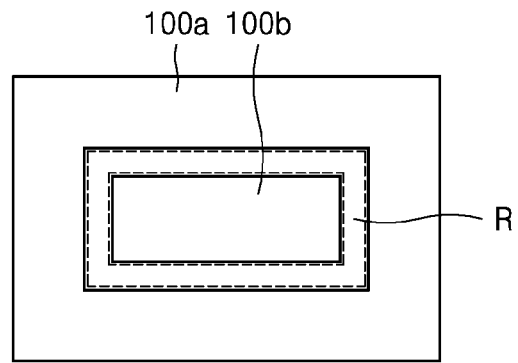

FIGS. 3A and 3B are diagrams illustrating arrangements of display apparatuses of a display apparatus system according to embodiments.

Referring to FIG. 3A, the first and second display apparatuses 100a and 100b may be arranged so that a bottom edge of the first display apparatus 100a and a top edge of the second display apparatus 100b face each other. The bottom edge of the first display apparatus 100a and the top edge of the second display apparatus 100b may have a curve shape. In this case, the space R may be a range existing between the first and second display apparatuses 100a and 100b and may be the range having a geometrical shape including all curved and linear edges. At least one of the first and second display apparatuses 100a and 100b may change the shape so that the first display apparatus 100a is extended in a direction of the bottom edge or the second display apparatus 100b is extended in a direction of the top edge and thus, the display range is arranged in the space R.

Alternatively, referring to FIG. 3B, the first display apparatus 100a, in a shape of surrounding the second display apparatus 100b, may be arranged in a rectangular loop-shape on the outskirts of the second display apparatus 100b. In this case, the space R maybe a range with the rectangular loop-shape existing between the first and second display apparatuses 100a and 100b. At least one of the first and second display apparatuses 100a and 100b may change the shape so that the first display apparatus 100a is extended in respective direction of inner edges or the second display apparatus 100b is extended in respective direction of outer edges and thus, the display range is arranged in the space R.

As described above, the first and second display apparatuses 100a and 100b included in the display apparatus system according to the present inventive concept may be display apparatuses having various shapes and may be arranged in various geometrical relationships.

Figure 4A:
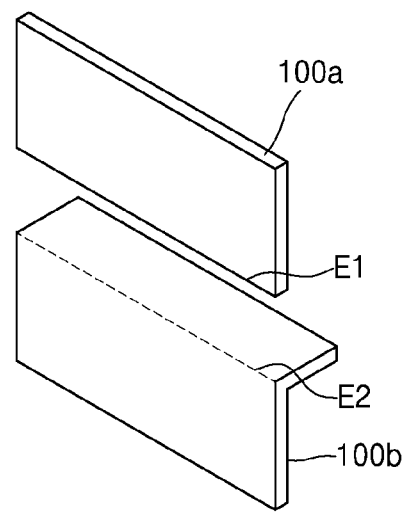
FIG. 4A and FIG. 4B are diagrams illustrating methods of operating display apparatuses of a display apparatus system according to embodiments.
Figure 4B:
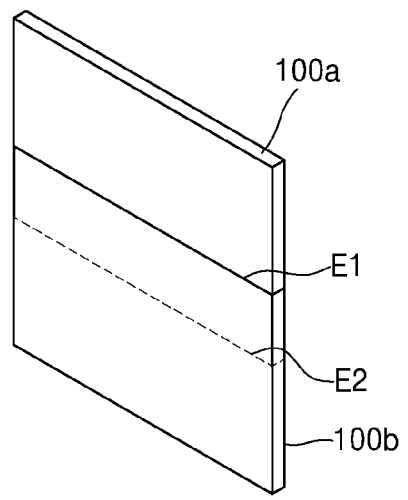

FIGS. 4A and 4B are diagrams illustrating methods of arranging a display range in a space between display apparatuses of a display apparatus system according to embodiments.

Referring to FIG. 4A, a display apparatus system may include a first display apparatus 100a and a second display apparatus 100b. In this case, at least one of the first and second display apparatuses 100a and 100b may be a bendable display apparatus. For example, the second display apparatus 100b may be a bendable display apparatus. In this case, a second edge E2 of the second display apparatus 100b may be an inside edge in a display range of the second display apparatus 100b and may be a location in which the second display apparatus 100b may be bent. In other words, when the second display apparatus 100b is bent, the second edge E2 is revealed as an edge, and when the second display apparatus 100b is changed to an un-bent shape, the second edge E2 may be changed into the inside range of the display range of the second display apparatus 100b.

In this case, referring to FIG. 4B, a degree of bending of the second edge E2 of the second display apparatus 100b may be changed. In detail, the second edge E2 may be changed to an un-bent state or a less-bent-than-before-the-change state. In this case, the display range which is a bent top portion of the second edge E2 of the second display apparatus 100b may move from the bent state of the second display apparatus 100b to a range which has been a space between the first display apparatus 100a and the second display apparatus 100b. As a result, the second display apparatus 100b may be extended and an effect may occur that the display range may be arranged in the space between the first display apparatus 100a and the second display apparatus 100b.

A case in which only the second display apparatus 100b is a bendable display apparatus is described as an example in FIGS. 4A and 4B; however, the present inventive concept is not limited thereto and both of the first and second display apparatuses 100a and 100b may be bendable display apparatuses. In this case, the first edge E1 of the first display apparatus 100a may be an inside edge in the display range and may be a location in which the first display apparatus 100a may be bent.

Figure 5A:
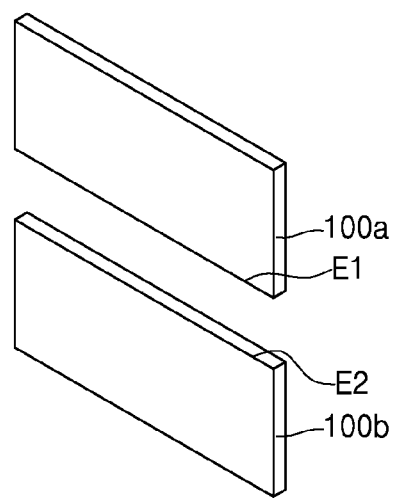
FIG. 5A and FIG. 5B are diagrams illustrating methods of operating display apparatuses of a display apparatus system according to embodiments.
Figure 5B:
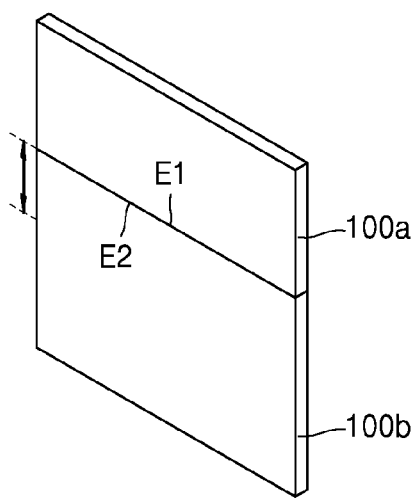

FIGS. 5A and 5B are diagrams illustrating another method of arranging a display range in a space between display apparatuses of a display apparatus system according to embodiments.

Referring to FIG. 5A, a display apparatus system may include a first display apparatus 100a and a second display apparatus 100b. In this case, at least one of the first and second display apparatuses 100a and 100b may be a stretchable display apparatus. For example, the second display apparatus 100b may be the stretchable display apparatus. In this case, at least a portion of the second display apparatus 100b may be stretched in a direction of the second edge E2. In detail, the second display apparatus 100b may be a manufactured apparatus in which an entire range of the second display apparatus 100b or a range inside a certain range from the second edge E2 may be stretchable via a physical or electric signal.

In this case, referring to FIG. 5B, a degree of stretching of the second display apparatus 100b may be changed. In other words, the second display apparatus 100b may be stretched in a direction of the second edge E2. The second display apparatus 100b may be stretched until the second edge E2 contacts with the first edge E1 of the first display apparatus 100a or up to a position in which the second edge E2 is not in contact with the first edge E1. In this case, the second display apparatus 100b may be stretched to a range which has been the space between the first and second display apparatuses 100a and 100b. As a result, the second display apparatus 100b may be extended and an effect may occur that the display range may be arranged in the space between the first display apparatus 100a and the second display apparatus 100b.

A case in which only the second display apparatus 100b is a stretchable display apparatus in FIGS. 5A and 5B is described as an example; however, the present inventive concept is not limited thereto, and both of the first and second display apparatuses 100a and 100b may be stretchable display apparatuses. In this case, at least a portion of the first display apparatus 100a may be stretched in a direction of the first edge E1.

Alternatively, one of the first and second display apparatuses 100a and 100b may be a bendable display apparatus and the other may be a stretchable display apparatus.

As described above, a display apparatus system of the present inventive concept may include the first and second display apparatuses 100a and 100b such that at least one of them include either a bendable display apparatus or a stretchable display apparatus. In this case, the display apparatus system may drive display apparatuses to a first state in which a space exists between the first and second display apparatuses 100a and 100b, or to a second state in which the space between the first and second display apparatuses is filled with the display range via an extension of at least one of the first and second display apparatuses 100a and 100b.

Figure 6A:
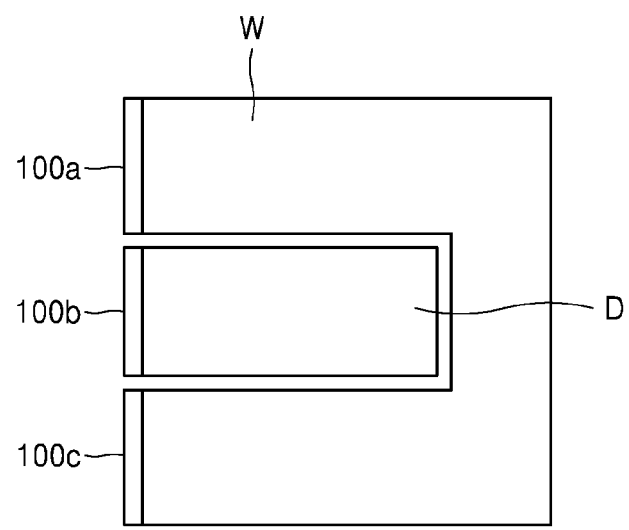
FIG. 6A and FIG. 6B are diagrams illustrating a display apparatus system according to embodiments.
Figure 6B:
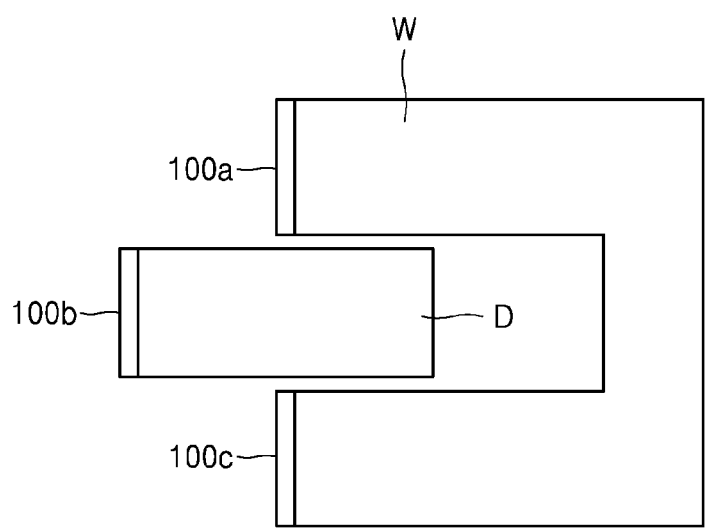

FIGS. 6A and 6B are diagrams illustrating a display apparatus system according to embodiments.

Referring to FIG. 6A, the display apparatus system according to an embodiment may include a first and third display apparatuses 100a and 100c arranged on a fixed wall W, and a second display apparatus 100b arranged on a movable drawer D.

The fixed wall W may denote an object which is relatively fixed with respect to the movable drawer D. In other words, a fixed wall W may demote a vehicle body which is relatively fixed in a moving vehicle, and the movable drawer D may denote a drawer existing inside the vehicle. The movable drawer D may denote a storage space which is manually or automatically movable, and may further denote various objects, which are relatively movable with respect to a fixed portion, such as a space into which a disc or a CD may be inserted and a portion of a wall designed to move.

The movable drawer D in which the second display apparatus 100b may be arranged may be arranged at the center of the fixed wall W. In this case, the first display apparatus 100a may be arranged at a top portion of the fixed wall W and the third display apparatus 100c may be arranged at a bottom portion of the fixed wall W, based on the movable drawer D.

In this case, referring to FIG. 6B, the movable drawer D may move in a first direction with respect to the fixed wall W. Since the first through third display apparatuses 100a through 100c may be respectively fixed to the fixed wall W or the movable drawer D, the second display apparatus 100b may also move in the first direction with respect to the first and third display apparatuses 100a and 100c. The movable drawer D may move in the first direction with respect to the fixed wall W and become protruded from the fixed wall W, and may move into the inside of the fixed wall W via moving in a direction opposite to the first direction. In this case, a distance between an edge of the bottom portion of the first display apparatus 100a and that of the top portion of the second display apparatus 100b may be used as a center for description. When the movable drawer D is inside the fixed wall W, the distance between the edge of the bottom portion of the first display apparatus 100a and that of the top portion of the second display apparatus 100b may be a first distance which may be a minimum. In embodiments, when the movable drawer D is protruded at the maximum from the fixed wall W, the distance between the edge of the bottom portion of the first display apparatus 100a and the edge of the top portion of the second display apparatus 100b may be a second distance which may be a maximum.

In this case, the first through third display apparatuses 100a through 100c may be a plurality of display apparatuses capable of displaying one image. In detail, when the movable drawer D is protruded from the fixed wall W (for example, when the distance between the edge of the bottom portion of the first display apparatus 100a and that of the top portion of the second display apparatus 100b is longer than the first distance), the first through third display apparatuses 100a through 100c may display respectively different images. When the movable drawer D is inside the fixed wall W (for example, the distance between the edge of the bottom portion of the first display apparatus 100a and that of the top portion of the second display apparatus 100b is the second distance), the first through third display apparatuses 100a through 100c may be driven to display one image. However, a space in which an image may not be displayed may exist between the first and second display apparatuses 100a and 100b, and between the second and third display apparatuses 100b and 100c. Due to this reason, one image which the first through third display apparatuses are to display may not be adequately displayed. To improve this effect, the display apparatus system may be operated so that at least one of the first through third display apparatuses 100a through 100c may be extended to have the display range arranged in the space between display apparatuses, when the movable drawer D is inside the fixed wall W (for example, when the distance between the edge of the bottom portion of the first display apparatus 100a and that of the top portion of the second display apparatus 100b is the first distance). A detailed description about this case will be given via FIGS. 7A and 7B.

Figure 7A:
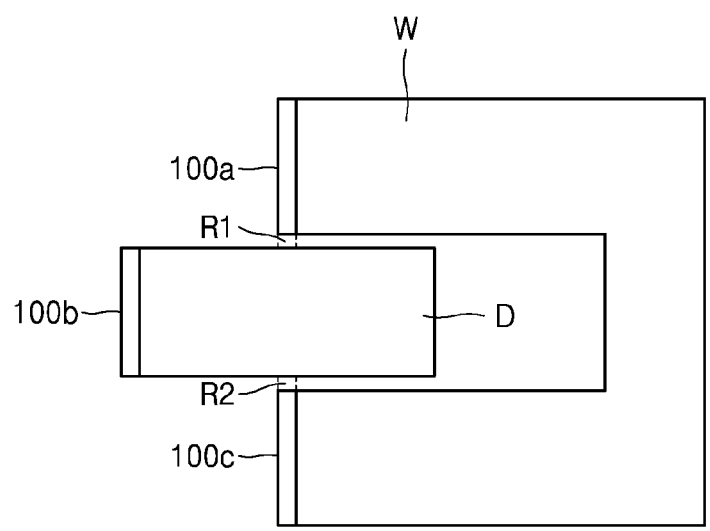
FIG. 7A and FIG. 7B are diagrams illustrating operations of display apparatuses of a display apparatus system according to embodiments.
Figure 7B:
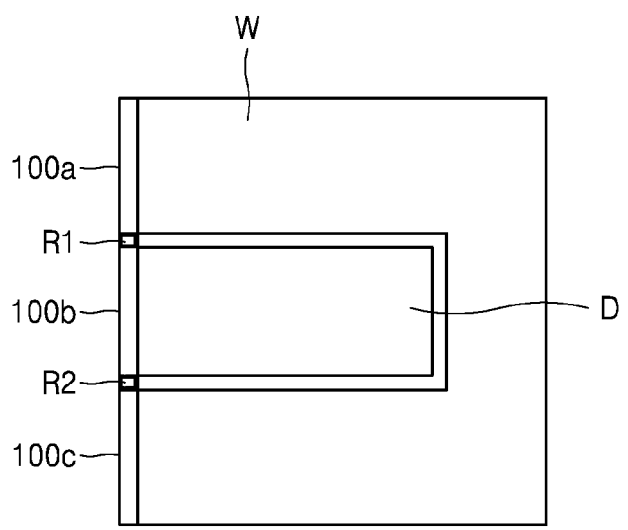

FIGS. 7A and 7B are diagrams illustrating changes of display apparatuses according to states of a display apparatus system according to embodiments.

Referring to FIG. 7A, the display apparatus system according to an embodiment may include the first and third display apparatuses 100a and 100c arranged on the fixed wall W, and the second display apparatus 100b arranged on the movable drawer D. In this case, a first space R1 and a second space R2 may exist between the fixed wall W and the movable drawer D. In detail, the first space R1 may exist between the top portion of the fixed wall W in which the first display apparatus 100a may be arranged and the drawer D in which the second display apparatus 100b may be arranged, and the second space R2 may exist between the bottom portion of the fixed wall W in which the third display apparatus 100c may be arranged and the drawer D in which the second display apparatus 100b may be arranged. When the movable drawer D is protruded from the fixed wall W as illustrated in FIG. 7A, the first through third display apparatuses 100a through 100c may maintain an un-extended state.

In this case, referring to FIG. 7B, when the movable drawer D is inside the fixed wall W, at least a portion of the first through third display apparatuses 100a through 100c may be extended and the display range may be arranged in the first and second spaces R1 and R2. For example, when the movable drawer D is inside the fixed wall W as illustrated in FIG. 7B, the second display apparatus 100b may be extended both in a direction in which the first display apparatus 100a exists and in a direction in which the third display apparatus 100c exists, and the display range may be arranged in the first and second spaces R1 and R2. In this case, the second display apparatus 100b may be a bendable display apparatus or a stretchable display apparatus.

The display apparatus system may further include a controller to control whether to extend at least a portion of the first through third display apparatuses 100a through 100c or not. In embodiments, the display apparatus system may further include a sensor unit to identify respective arrangement states of the first through third display apparatuses 100a through 100c. In this case, the sensor unit may include various sensors to identify respective arrangements of the first through third display apparatuses 100a through 100c. For example, the sensor unit may include a sensor to measure a distance between one edge of the first display apparatus 100a and that of the second display apparatus 100b. Alternatively, the sensor unit may include an illuminance sensor to identify whether a certain display apparatus is protruded or not.

As described above, the display apparatus system of the present inventive concept may include a plurality of display apparatuses arranged on one side of the fixed wall W and one side of the movable drawer D. When the movable drawer D is in a state of being protruded from the fixed wall W or of movement, the display apparatus system may have the plurality of display apparatuses maintain the un-extended state and have the movable drawer D adequately perform a role of a storage space. In embodiments, when the movable drawer D is inside the fixed wall W, the display apparatus system may have at least a portion of the plurality of display apparatuses extended, have the display range arranged in the spaces between the fixed wall W and the movable drawer D, and display a clear and full image.

FIGS. 8, 9A, 9B, 10A, and 10B are diagrams illustrating applications of a display apparatus system according to embodiments.

Figure 8:
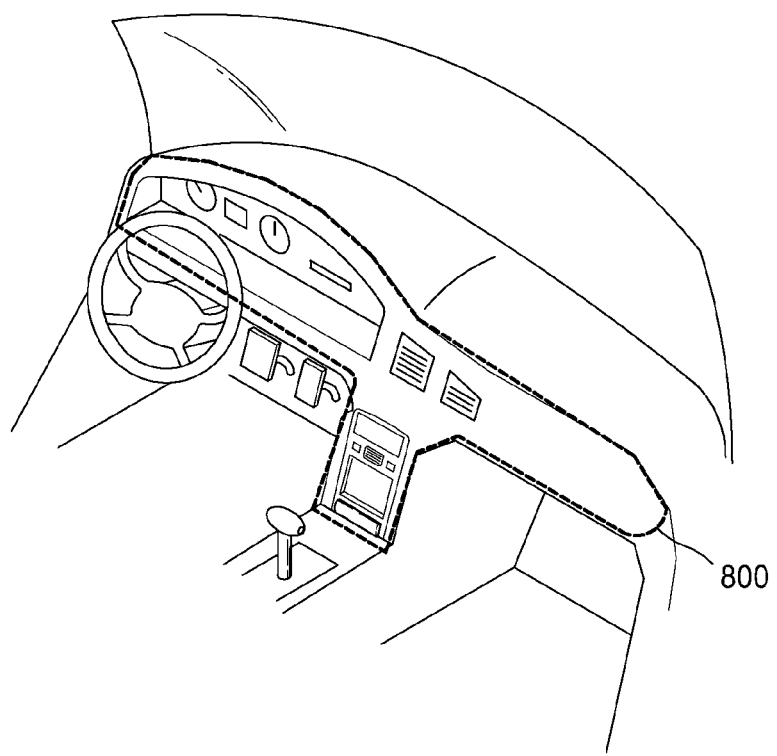
FIG. 8 is a diagram illustrating an application of a display apparatus system according to an embodiment.

Referring to FIG. 8, a vehicle dashboard 800 may be arranged in a vehicle. An entire portion or a portion of the vehicle dashboard 800 may include a display apparatus. In this case, the vehicle dashboard 800 may include various display apparatuses performing various functions such as an instrument panel, a center fascia, and a navigation panel.

Figure 9A:
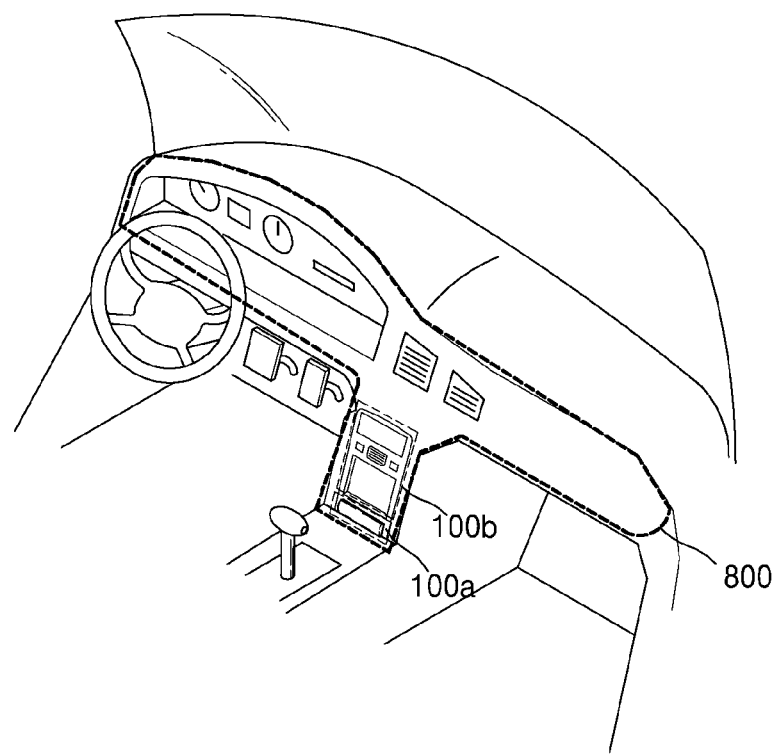
FIG. 9A and FIG. 9B are diagrams illustrating applications of a display apparatus system according to embodiments.

Referring to FIG. 9A, the vehicle dashboard 800 may include a storage space and a center fascia. A first display apparatus 100a may be arranged on a front surface of the storage space. In embodiments, a second display apparatus 100b performing a function of the center fascia may be arranged adjacent to a top edge of the first display apparatus 100a in the vehicle dashboard 800. When the storage space is not protruded as illustrated in FIG. 9A, the first and second display apparatuses 100a and 100b may display one image. For example, the first and second display apparatuses 100a and 100b may display one image showing an operation state of an audio, an air conditioner, etc. of a vehicle. In this case, at least one of the first and second display apparatuses 100a and 100b may be extended and arrange the display range in a space between the first and second display apparatuses 100a and 100b to display a clear and full image via the first and second display apparatuses 100a and 100b (for example, an image without an empty range in which an image is not displayed in a middle portion).

Figure 9B:
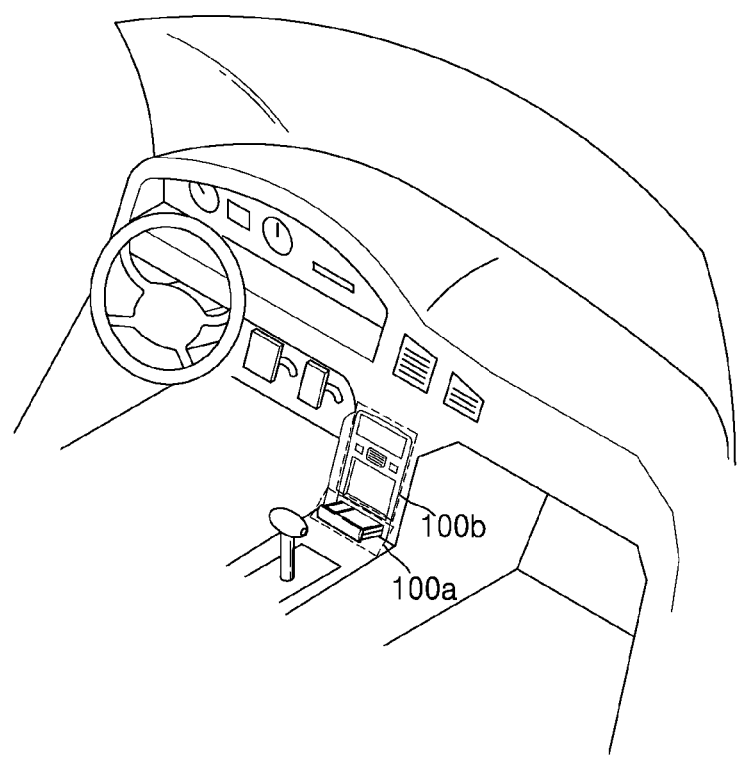

Referring to FIG. 9B, when the storage space is protruded, the first and second display apparatuses 100a and 100b may display respectively different images or at least one of the first and second display apparatuses 100a and 100b may have an image display function disabled. In this case, both of the first and second display apparatuses 100a and 100b may not be extended. In other words, when the storage space is not protruded, at least one of the first and second display apparatuses 100a and 100b may have been extended, and a display apparatus in an extended state may be changed to the un-extended state when the storage space is protruded. Via this configuration, the vehicle dashboard 800 may include a practical storage space and, at the same time, may include a display apparatus with a smooth and attractive exterior design.

Figure 10A:
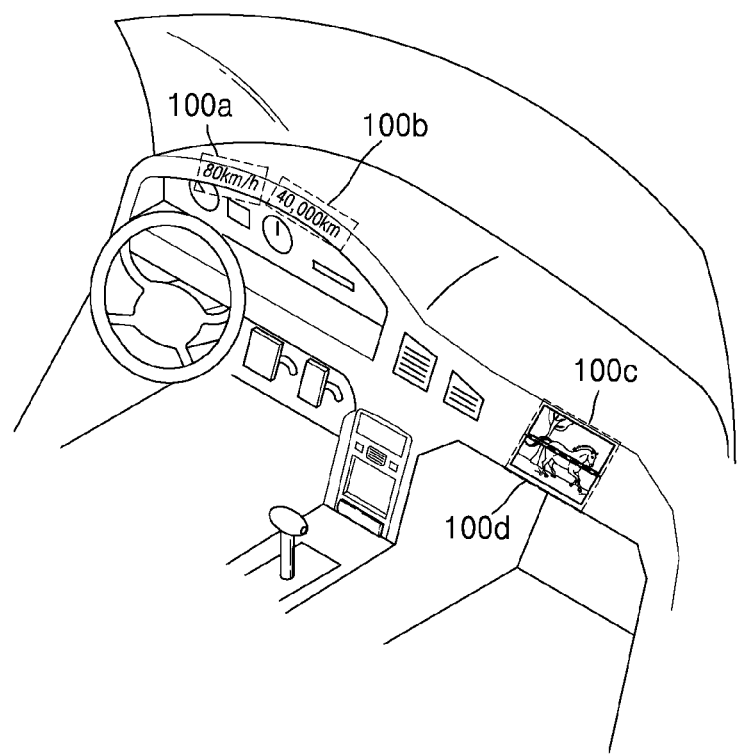
FIG. 10A and FIG. 10B are diagrams illustrating applications of a display apparatus system according to embodiments.
Figure 10B:
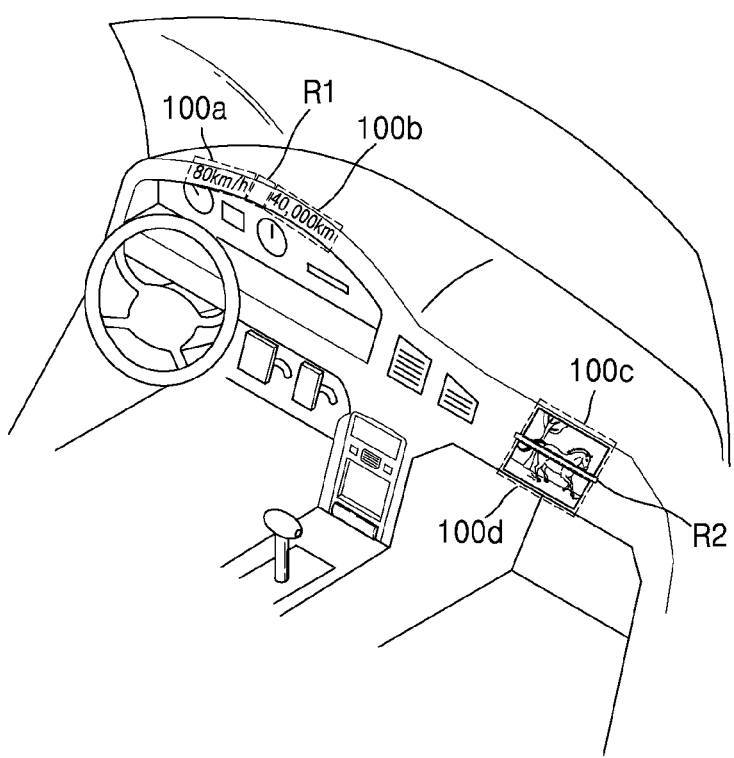

In embodiments, referring to FIG. 10A, a first and second display apparatuses 100a and 100b displaying information about vehicle operation may be arranged on the vehicle dashboard 800 on a driver's side and a third and fourth display apparatuses 100c and 100d displaying one image on the vehicle dashboard 800 on a passenger's side. Referring to FIG. 10B, a space through which an air bag may be released may exist between the first and second display apparatuses 100a and 100b. The space through which an air bag may be released may exist also between the third and fourth display apparatuses 100c and 100d. In this case, when the air bag is not in use as illustrated in FIG. 10A, at least one of the image-display surfaces (or image-display areas) of the first and second display apparatuses 100a and 100b may be extended and the display range may be arranged in the space between the first and second display apparatuses 100a and 100b. Likewise, when the air bag is not in use, at least one of the third and fourth display apparatuses 100c and 100d may be extended and the display range may be arranged in the space between the third and fourth display apparatuses 100c and 100d. Via this configuration, a space to implement necessary functions for a vehicle may be secured and, at the same time, a display apparatus with a smooth and attractive exterior design may be arranged on the vehicle dashboard.

It should be understood that embodiments described herein should be considered in an illustrative sense and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope defined by the following claims.

What is claimed is:

1. A display system comprising:
   a first display apparatus, which comprises a first image-display surface;
   a second display apparatus, which comprises a second image-display surface, wherein at least one of the first image-display surface and the second image-display surface is configured to perform at least one of extending and bending in response to and subsequent to at least one of a first condition and a second condition, wherein the first condition is related to that the second image-display surface moves relative to the first image-display surface, wherein the second condition is related to that a distance between the first image-display surface and the second image-display surface becomes equal to a predetermined length, wherein the second image-display surface is configured to extend toward the first image-display surface responsive to the at least one of the first condition and the second condition to reduce a space between the first image-display surface and the second image-display surface in a plane, and wherein the first image-display surface and the second image-display surface are coplanar in the plane before the second image-display surface extends toward the first image-display surface.

2. The display system of claim 1, wherein the first condition is movement of the second image-display surface away from the first image-display surface.

3. The display system of claim 1, wherein the first condition is movement of the second image-display surface toward the first image-display surface.

4. The display system of claim 1, wherein the second condition is that the distance between the first image-display surface and the second image-display surface increases to become equal to the predetermined length.

5. The display system of claim 1, wherein the second condition is that the distance between the first image-display surface and the second image-display surface decreases to become equal to the predetermined length.

6. The display system of claim 1, wherein the first image-display surface is configured to extend toward the second image-display surface responsive to the at least one of the first condition and the second condition.

7. The display system of claim 1, wherein the second image-display surface is configured to extend in at least two directions toward the first image-display surface responsive to the at least one of the first condition and the second condition.

8. The display system of claim 7, wherein the first image-display surface is configured to extend in two or more directions toward the second image-display surface responsive to the at least one of the first condition and the second condition.

9. The display system of claim 1, wherein a first portion of the second image-display surface is configured to bend with respect to a second portion of the second image-display surface toward the first image-display surface responsive to the at least one of the first condition and the second condition.

10. The display system of claim 9, wherein a width of the first portion of the second image-display surface is less than or equal to the predetermined length.

11. The display system of claim 9, wherein a width of the first portion of the second image-display surface is substantially equal to the predetermined length.

12. The display system of claim 9, wherein the first portion of the second image-display surface is not coplanar with either of the first image-display surface and the second portion of the second image-display surface before the bending, and wherein the first portion of the second image-display surface reduces a space between the first image-display surface and the second image-display surface in a plane and is coplanar with at least one of the first image-display surface and the second portion of the second image-display surface in the plane after the bending.

13. The display system of claim 1, wherein the first image-display surface and the second image-display surface are configured to operate in a first collaborative display mode prior to the at least one of the extending and bending, wherein the first image-display surface and the second image-display surface are configured to operate in a second collaborative display mode responsive to the at least one of the extending and bending, wherein the first image-display surface is configured to display a first portion of a first object in the first collaborative display mode, wherein the second image-display surface is configured to display a second portion of the first object in the first collaborative display mode, wherein the first image-display surface is configured to display a first portion of a second object in the second collaborative display mode, wherein the second image-display surface is configured to display a second portion of the second object in the second collaborative display mode, wherein the display system has a first total image-display area in the first collaborative display mode, wherein the display system has a second total image-display area in the second collaborative display mode, and wherein the second total image-display area is larger than the first total image-display area.

14. The display system of claim 1, wherein the first image-display surface and the second image-display surface are configured to operate in an individual display mode prior to the at least one of the extending and bending, wherein the first image-display surface and the second image-display surface are configured to operate in a collaborative display mode responsive the at least one of the extending and bending, wherein the first image-display surface is configured to display a first object in the individual display mode, wherein the second image-display surface is configured to display a second object in the individual display mode, wherein the first image-display surface is configured to display a first portion of a third object in the collaborative display mode, wherein the second image-display surface is configured to display a second portion of the third object in the collaborative display mode, wherein the display system has a first total image-display area in the individual display mode, wherein the display system has a second total image-display area in the collaborative display mode, and wherein the second total image-display area is larger than the first total image-display area.

15. The display system of claim 1, wherein the first image-display surface and the second image-display surface are configured to operate in an individual display mode when the first image-display surface is not coplanar with the second image-display surface, wherein the first image-display surface and the second image-display surface are configured to operate in a collaborative display mode when the first image-display surface is coplanar with the second image-display surface, wherein the first image-display surface is configured to display a first object in the individual display mode, wherein the second image-display surface is configured to display a second object in the individual display mode, wherein the first image-display surface is configured to display a first portion of a third object in the collaborative display mode, and wherein the second image-display surface is configured to display a second portion of the third object in the collaborative display mode.

16. The display system of claim 15, wherein the display system has a first total image-display area in the individual display mode, wherein the display system has a second total image-display area in the collaborative display mode, and wherein the second total image-display area is larger than the first total image-display area.

17. The display system of claim 1, wherein the second image-display surface is configured to extend in a first direction toward the first image-display surface subsequent to movement of the second image-display surface relative to the first image-display surface in a second direction, and wherein the second direction is different from the first direction.

18. The display system of claim 17, wherein the second direction is at an angle with respect to the first direction, and wherein the angle is greater than 0 degree and less than 180 degrees.

19. A method of operating a display system, the display system comprising a first display apparatus and a second display apparatus, the first display apparatus comprising a first image-display surface, the second display apparatus comprising a second image-display surface, the method comprising:

performing at least one of extending and bending of at least one of the first image-display surface and the second image-display surface in response to and subsequent to at least one of a first condition and a second condition, wherein the first condition is related to that the second image-display surface moves relative to the first image-display surface, wherein the second condition is related to that a distance between the first image-display surface and the second image-display surface becomes equal to a predetermined length, wherein the second image-display surface is configured to extend toward the first image-display surface responsive to the at least one of the first condition and the second condition to reduce a space between the first image-display surface and the second image-display surface in a plane, and wherein the first image-display surface and the second image-display surface are coplanar in the plane before the second image-display surface extends toward the first image-display surface.

\* \* \* \* \*